March 15, 1927.

H. NYQUIST 1,620,735

MULTIPLEX SIGNALING SYSTEM

Filed March 12, 1925   5 Sheets-Sheet 1

INVENTOR
H. Nyquist
BY
ATTORNEY

March 15, 1927.                                                              1,620,735
                                H. NYQUIST
                        MULTIPLEX SIGNALING SYSTEM
                    Filed March 12, 1925      5 Sheets-Sheet 2

INVENTOR
H. Nyquist
BY
ATTORNEY

March 15, 1927.　　　　　　　　　　　　　　　　　　　1,620,735
H. NYQUIST
MULTIPLEX SIGNALING SYSTEM
Filed March 12, 1925　　　　5 Sheets-Sheet 3

INVENTOR
H. Nyquist
BY
ATTORNEY

March 15, 1927.

H. NYQUIST 1,620,735

MULTIPLEX SIGNALING SYSTEM

Filed March 12, 1925    5 Sheets-Sheet 4

INVENTOR
H. Nyquist
BY
ATTORNEY

March 15, 1927.                        1,620,735
H. NYQUIST
MULTIPLEX SIGNALING SYSTEM
Filed March 12, 1925      5 Sheets-Sheet 5

INVENTOR
H. Nyquist
BY
ATTORNEY

Patented Mar. 15, 1927.

1,620,735

UNITED STATES PATENT OFFICE.

HARRY NYQUIST, OF MILLBURN, NEW JERSEY, ASSIGNOR TO AMERICAN TELEPHONE AND TELEGRAPH COMPANY, A CORPORATION OF NEW YORK.

MULTIPLEX SIGNALING SYSTEM.

Application filed March 12, 1925. Serial No. 15,058.

The principal object of my invention is to provide a new and improved method and suitable apparatus for utilizing a line for the simultaneous transmission of a number of messages. Another object of my invention is to provide for a system of multiplex telegraphy with discrimination by difference of phase between messages in the same frequency range. Still another object of my invention relates to providing for magnitude discrimination as well as for phase discrimination between different messages transmitted within the same frequency range. Another object of my invention is to provide a component current of a certain frequency to be transmitted for synchronizing purposes and also to be utilized as a signaling channel. Still another object of my invention is to provide for signaling on a synchronizing current component and to provide means for compensating at the receiving end so that that current may be delivered to a branch circuit for synchronizing unmodified by the signaling. These and various other objects of my invention will become apparent on consideration of a limited number of specific examples of practice according to the invention, which I have chosen to illustrate and describe in this specification. With the understanding that the following specification is a disclosure of these particular examples of the invention and that the scope of the invention will be indicated in the appended claims, I now proceed to describe the structure and operation of the apparatus shown in the drawings.

Figure 1:
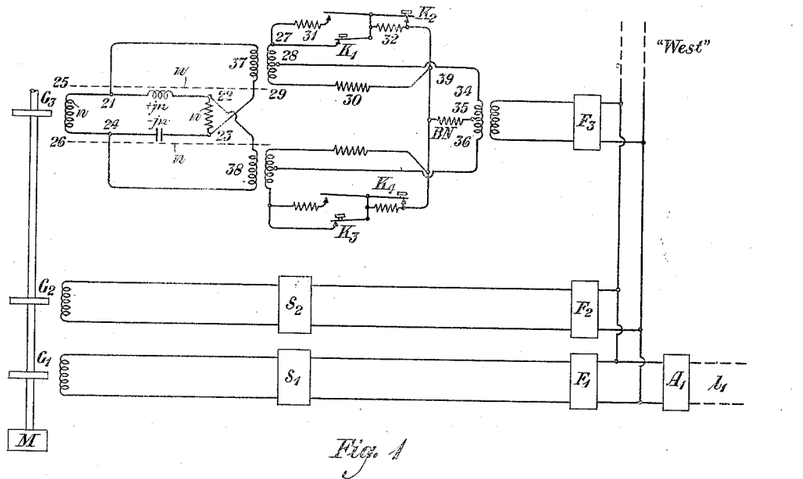
Figure 1 is a diagram of multiplex sending equipment.

At the station "West" shown in Fig. 1, the constant speed motor M drives the inductor alternators, of which three are shown, $G_1$, $G_2$ and $G_3$, of different "carrier current" frequencies. The output current from the generator $G_3$ goes over the circuit 21—22—23—24 through an inductance coil of impedance $+jn$, a resistance $n$ and a condenser of impedance $-jn$ in series, where $n$ has any suitable value, say 600 ohms. The value $n$ is the resistance of the generator $G_3$ looking into it across the points 21, 24 and it is important in the particular example illustrated that the impedance of the generator should be substantially a pure resistance as seen from its output terminal. The network 21—22—23—24 is a balanced Wheatstone bridge because the product of the impedances of one pair of opposite arms is equal to the corresponding product for the other pair of opposite arms. Hence there is no interference in the transformer winding 37 due to electromotive force in the winding 38, nor vice versa. This is true for the particular frequency of the generator $G_3$. It is also true for other frequencies because with a variation of frequency the impedance of the coil and the impedance of the condenser will vary inversely and, therefore, their product will be constant, and equal to $$(+jn)(-jn)=n^2.$$

Looking across the circuit at 25 in the direction of the arrow, the impedance is $n$; this is true because the circuit of the coil 38 may be considered open on account of the bridge balance, and it follows that the impedance between the points 21 and 23 is $$\frac{(n+jn)(n-jn)}{(n+jn)+(n-jn)}=n.$$

The currents in the windings 37 and 38 are 90 degrees apart in phase. To prove this, notice that if a given voltage is impressed across the points 21 and 23, the current into the generator will lead by 45 degrees. The design is such that the impedance across the terminals of the coil 37 is effectively a pure resistance. This being the case, it follows that the current in the winding 37 due to a voltage from the generator $G_3$ will lead by 45 degrees. Similarly, it can be shown that the current due to the generator $G_3$ in the winding 38 will lag 45 degrees, and hence the currents in the windings 37 and 38 are 90 degrees apart.

Figure 5:
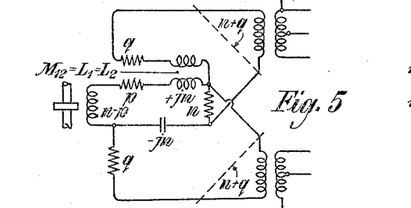
Fig. 5 is a diagram of a detail modification in Fig. 1.

Thus far it has been assumed that the resistance of the coil marked with the impedance value $+jn$ is negligible. Fig. 5 is a modified diagram to take care of the case when the resistance of this coil is not neglected. Assume that its resistance is $p$ and associate another coil with a close inductive coupling whose self-inductance is the same and whose resistance is $q$. Then with the modified impedance values written on Fig. 5, it may readily be shown that the bridge is in balance as before.

To explain the operation of the keys $K_1$ and $K_2$ in Fig. 1, first assume that the keys and the resistances 31 and 32 are removed and that the points 27 and 39 are connected by a resistance equal to the resistance 30. The points 28 and 39 will then be neutral points, no matter what current flows in the winding 37, and there will be no transmission. It will readily be seen that while the key $K_2$ remains closed, the key $K_1$ gives zero resistance from 27 to 39 when it is closed for marking and infinite resistance when it is open for spacing. As is well known, when two unequal resistances are joined it is permissible and often convenient to look at the point of junction as a point of reflection and to consider that there is a reflected current wave at the point of junction. In the case here under consideration, the reflected wave from point 27 is transmitted in part into the line. It is also well known that in the limiting case when one of the resistances is made zero and the other is left finite the reflected current is equal to and in phase with the incident current, whereas in the limiting case when one of the resistances is made infinite and the other is made finite the reflected current is equal to and in phase opposition to the incident current. If, therefore, the impedance at 27 is changed from zero to infinity the effect is to reverse the current transmitted to the line. Now if a resistance artificial line is connected between point 27 and the point of reflection and if this artificial line is so designed that there is no reflection at point 27, then the incident wave will traverse the network and be attenuated, moreover, the reflected wave will traverse the line also. The net result of the artificial line is that the current transmitted to the transmission line is attenuated by twice the loss of the artificial line. While the function of the key $K_1$ is to open and close the circuit and thus to reverse the phase of the transmitted current, the function of key $K_2$ is to add or remove artificial line and thus to change the magnitude without changing the phase.

Thus it will be seen that the key $K_1$ transmits by phase reversal of the carrier current and the key $K_2$ transmits by changing the magnitude of one component of the carrier current from generator $G_3$.

In a similar manner, the keys $K_3$ and $K_4$, respectively, transmit by phase reversal and magnitude change in the other carrier current component which differs 90 degrees in phase from that controlled by the keys $K_1$ and $K_2$. These two carrier current components of the same frequency, differing 90 degrees in phase and varying in magnitude as determined by the operation of the keys $K_2$ and $K_4$, are superposed in the input of the band filter $F_3$ whose output goes in multiple with the outputs from other similar filters to the line $l_1$. These filters are confluent band filters each with relatively narrow band width and with the carrier frequency near the middle of its range so as to produce no serious phase shift during the building up of the signals. The currents to the line $l_1$ are amplified by the amplifier $A_1$.

The box $S_2$ represents a network similar to that between the generator $G_3$ and the filter $F_3$. Accordingly, four more messages will be carried in the channel from the generator $G_2$ through the network $S_2$ and the filter $F_2$ and added in multiple on the line $l_1$.

Alternating current of another frequency from the generator $G_1$ is passed through the network $S_1$ and the filter $F_1$ and the terminal repeater or amplifier $A_1$ to the line $l_1$. This current, as a component on the line $l_1$, is the synchronizing component for use at the receiving end, as will be explained presently. It is also utilized for signaling by means of the sending network $S_1$, but for the present, the use of the network $S_1$ may be disregarded and the current component from the generator $G_1$ may be thought of as transmitted for synchronizing purposes only.

Figure 2:
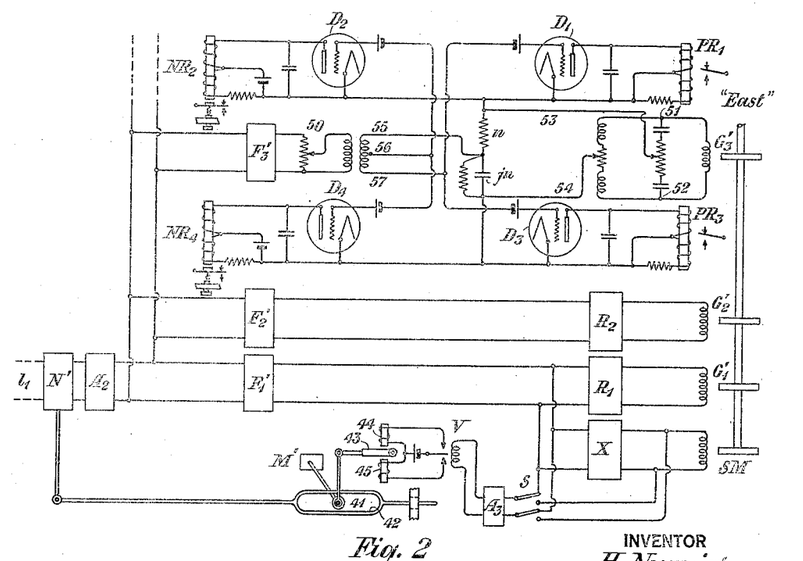
Fig. 2 is a diagram of the corresponding receiving equipment.

Referring to Fig. 2, this shows the receiving station which may be called "East". The currents coming in over the line $l_1$ pass through the adjustable artificial line or network N′ which is controlled automatically in a manner to be described presently. This network N′ attenuates the currents so as to give a uniform magnitude in its output for the same signal elements from one time to another. The currents, thus attenuated to a standard magnitude, pass through the amplifier or terminal repeater $A_2$ to the filters $F_1′$, $F_2′$, and $F_3′$ in multiple. These filters correspond in their frequency ranges, respectively, with the filters $F_1$, $F_2$ and $F_3$ at station "West".

The current of pilot frequency for synchronizing goes through the filter $F_1'$ to branch circuits: one of these branch circuits goes to a receiving network $R_1$, and another to a network X whose function will be explained presently. Whatever the modification by signaling to the input of the network X, its output (as will be explained) is a simple, unmodified, alternating current of frequency definitely related to the frequency of the generator $G_1$ at the sending end, and this output current is applied to drive the synchronous motor SM, which in turn drives three generators $G_1'$, $G_2'$ and $G_3'$ of the same frequency respectively as $G_1$, $G_2$ and $G_3$ at station "West". The network X takes different forms as in Figs. 10, 11 and 12, and a switch S is provided which should be positioned accordingly. This switch S connects the input of amplifier $A_2$ to receive an alternating electromotive force of nearly constant magnitude, as will be shown in each instance.

The voltmeter relay V is connected across the output from the amplifier $A_2$ and normally holds its index at a certain position corresponding to a certain voltage. Whenever this voltage changes a little either way, the index closes one or the other of the circuits for the magnets 44 and 45 causing the armature 43 to move and bring the wheel 41 into contact with one side or the other of the yoke 42. The wheel 41 is rotated continuously by the motor M', so that the artificial line N' is adjusted one way or the other to adjust the attenuation therethrough. Thus it will be seen that by means of the voltmeter relay V and the associated apparatus, the current of pilot frequency is kept at uniform voltage as delivered to the input of the amplifier $A_2$. This insures that for the same signal elements in the other channels, the voltages delivered to the input of the amplifier $A_2$ will be uniform. Even if the attenuation on the line $l_1$ varies from time to time, as may be the case due to weather conditions, etc., there will be no corresponding variation of the current and voltage magnitudes in the output from the network N' at station "East". If the received currents at "East" were to vary from time to time, it might happen that signals of low magnitude would sometimes be strong enough to affect the high magnitude receiving apparatus, or that high magnitude would sometimes be too weak to affect the high magnitude receiving apparatus. By the adjustment at N', any such outcome is prevented.

The modulated current of carrier frequency determined by the generator $G_3$ at station "West" will, accordingly, find its way through the filter $F_3'$ and the potentiometer 50 to the primary of the transformer whose secondary is 55—57 with an intermediate tap at 56.

Current of the same frequency as the carrier frequency in the channel considered will be generated locally by the generator $G_3'$ whose output is applied across the points 51 and 52. The network between these two points is associated with the adjustable taps 53 and 54 so that at these taps an electromotive force of the proper phase and intensity may be drawn off and applied through the resistance $n$ and the condenser of impedance value $-jn$ in series therewith. The electromotive forces across the resistance $n$ and the condenser will be 90 degrees apart. Thus there will be applied to the grids of the detectors $D_1$ and $D_2$ locally generated electromotive force from the terminals of the resistance $n$ of the same or opposite phase with the received carrier current component controlled by keys $K_1$ and $K_2$, and there will be applied to the grids of the detectors $D_3$ and $D_4$ locally generated electromotive force from the terminals of the condenser whose impedance value is $-jn$, of the same phase as the received carrier current component controlled by the keys $K_3$ and $K_4$. The electromotive forces due to these received carrier current components will be superposed in the secondary windings 55—56 and 55—57 on the locally generated electromotive force.

Figure 6:
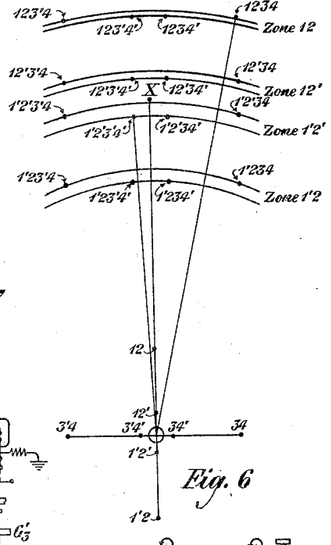
Figs. 6 and 7 are vector diagrams that will be referred to in explaining operation of the apparatus shown in the other figures.

Let the voltage on the grids of tubes $D_1$ and $D_2$ due to the generator $G_3'$ be represented by the vector OX in Fig. 6. The superposed electromotive force due to the received currents on the line will comprise two components 90° apart. One of these will be—

012 when both keys $K_1$ and $K_2$ are marking,

012' when key $K_1$ is marking and key $K_2$ is spacing,

01'2 when key $K_1$ is spacing and key $K_2$ is marking,

01'2' when both keys are spacing.

(As will be seen, unprimed numerals are used when the corresponding detectors are marking, primed when they are spacing). Similarly, keys $K_3$ and $K_4$ will determine a component 0—34, 0—3'4, 0—34' or 0—3'4'. These two components, combined with the locally generated electromotive force OX give one of 16 different resultants from 0 to a point which may readily be identified by the notation on Fig. 6. For example, when all four keys are marking the resultant is the vector from 0 to the point 1234; for another example, when all four keys are spacing the resultant is the vector from 0 to the point 1'2'3'4'. It will be seen that four substantially different vector magnitudes may be put on each of the detectors $D_1$ and $D_2$. These may be classed as lying in the four zones 12, 12', 1'2 and 1'2', as shown in Fig. 6. Detector $D_1$ and its associated elements of apparatus are adjusted so that when the grid voltage has some value between the zones 1'2 and 1'2', the core of the polar relay $PR_1$ will be substantially deenergized. But when key $K_1$ is marking, whatever the condition of the other keys $K_2$, $K_3$ and $K_4$, the resultant electromotive force on the grid of detector $D_1$ will have a magnitude greater than OX and the polar relay $PR_1$, controlled by detector $D_1$, will be on the marking side. On the other hand, when key $K_1$ is spacing, whatever the condition of the other three keys, the resultant electromotive force on the grid of detector $D_1$ will be of magnitude less than OX and the relay $PR_1$ will be on the spacing side.

The relay $NR_2$ is a neutral relay and is adjusted to be marginal in its operation. The adjustments of this relay $NR_2$ and the associated detector $D_2$ and their circuits are such that the relay $NR_2$ is deenergized when the voltage on the grid of the corresponding detector $D_2$ has the magnitude OX in Fig. 6. When the magnitude of this voltage changes either way, the magnetism in the core of relay $NR_2$ departs correspondingly one way or the other from zero. Because of its marginal character the relay $NR_2$ will not operate for a change of voltage to zone 12' or to zone 1'2', but it will operate for a change to zone 12 or zone 1'2. Its armature is made slow enough in release so that on a reversal of the magnetism in the core it will not drop; in other words, the armature of the relay $NR_2$ will not drop for a change in the key $K_1$, by which the grid voltage goes from one to the other of zones 12 and 1'2.

To recapitulate briefly, key $K_1$ causes shifts between zones 12 and 1'2 on the one hand and zones 12' and 1'2' on the other hand and actuates polar relay $PR_1$ accordingly, whereas key $K_2$ causes shifts between zones 12 and 1'2' on the one hand and zones 1'2 and 1'2' on the other hand, and operates neutral relay $NR_2$ accordingly.

The operation of detectors $D_3$ and $D_4$ and their corresponding relays is closely similar to that described for detectors $D_1$ and $D_2$ and their relays and need not be repeated in detail.

Figure 8:
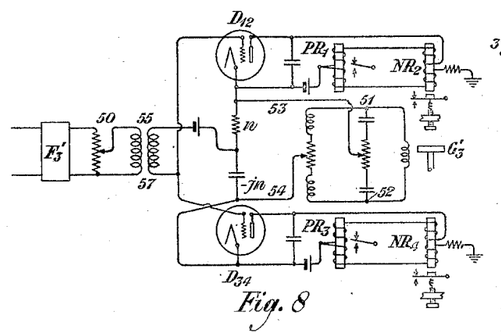
Fig. 8 is a modification corresponding to the upper part of Fig. 2.

Fig. 8 shows a modification of the part of Fig. 2 associated with filter $F_3'$ and generator $G_3'$. In this case the functions of the pair of detectors $D_1$ and $D_2$ are performed by the single detector $D_{12}$ and similarly $D_{34}$ takes the place of $D_3$ and $D_4$.

Figure 9:
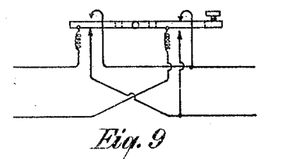
Fig. 9 is a diagram illustrating a reversing key that may be employed.

Thus far, the system of Figs. 1 and 2 has been described in the main as if the component current of frequency determined by the generator $G_1$ at "West" went through the network X at "East" and was applied for driving the synchronous motor SM. But at "West" a sending network $S_1$ is shown. This may be a simple reversing key, as shown in Fig. 9, and its effect will be merely to reverse the phase of the synchronizing current. The corresponding apparatus indicated by the boxes $R_1$ and X in Fig. 2, is shown in detail in Fig. 10. The received current component of synchronizing frequency passes through the filter $F_1'$ (Fig. 2) and over the conductors 71 to the push-pull detector 72—73. The output from this detector is taken off through the transformer 74, which is so located in the system that the fundamental and the odd harmonics are suppressed. Accordingly, the electromotive force induced in the secondary of the transformer 74 has a fundamental of double frequency. It will be apparent that the phase of this current is not affected by reversals of the input current. The coil 75 and condenser 76 are combined to be tuned to this double frequency, so that it is passed to the energizing winding of the synchronous motor SM.

Figure 10:
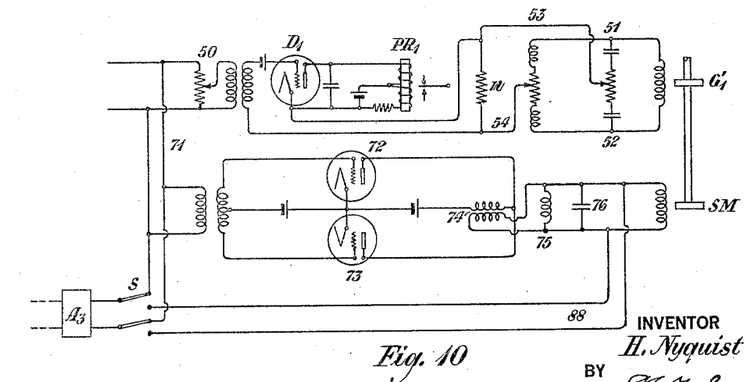
Fig. 10 is a diagram of circuits and apparatus for receiving messages transmitted on a synchronizing current and utilizing a derived double frequency current for effecting the synchronizing.

The current through switch S to voltmeter V is of substantially constant magnitude, because the phase reversals do not affect the magnitude.

The synchronizing current, modified by phase reversals for signaling, goes through the potentiometer 50 (Fig. 10) to the detector $D_1$, whose output controls the polar relay $PR_1$. This is similar to the correspondingly designated part of Fig. 2 and need not be described here in detail.

In order to transmit two messages on the synchronizing current component, each by phase reversals of respective components 90° apart, the sending network of Fig. 1 may be employed at $S_1$ with the understanding that the keys $K_2$ and $K_4$ are not employed. In this case the elements of Fig. 2 represented by the boxes $R_1$ and X will be as shown in detail in Fig. 11. The branch conductors 71 lead to a delay network Y. As will be seen presently, the network to the right of Y is controlled by the receiving relays and the object of the delay network Y is to introduce the same delay as for the operation of these relays.

Here as for Fig. 10, the current through switch S to voltmeter V is of substantially constant magnitude because the phase shifts for signaling do not affect the magnitude.

Figure 11:
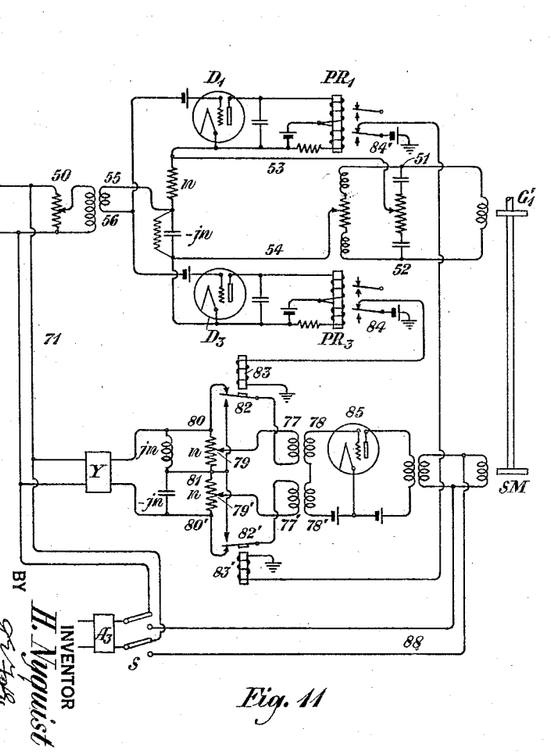
Fig. 11 is a diagram of apparatus and circuits for receiving two messages on 90° phases of a synchronizing current and compensating accordingly in a branch circuit so that the synchronizing current will be unaffected for synchronizing purposes.

The receiving network at the upper part of Fig. 11 is the same as that portion of the upper part of Fig. 2 obtained by omitting the portions involved in magnitude discrimination. It will be seen that in Fig. 11 an extra contact has been added on each of the two polar relays $PR_1$ and $PR_3$. When a phase reversal on one component of the synchronizing current actuates the polar relay $PR_3$, the contact 84 is actuated and this controls the relay 83 whose contact 82 reverses the electromotive force on the primary 77 of the transformer 77—78. Every reversal of phase of the component for the detector $D_3$ leads to such a change in the network at the lower part of Fig. 11 as to produce a compensating reversal there. Similarly, every reversal of phase of component for the detector $D_1$ produces a reversal for the terminals of the primary 77' of the transformer 77'—78'. Accordingly, the amplifier 85 receives only the unmodified alternating current of synchronizing frequency and its output goes to drive the synchronous motor SM.

Figure 13:
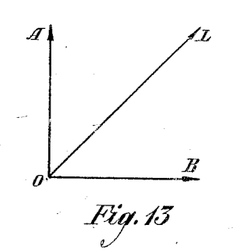
Figs. 13 to 18 are diagrams that will be referred to in explaining Fig. 11.
Figure 14:
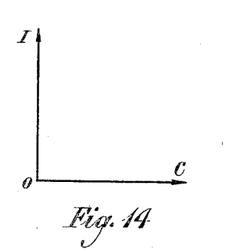
Figure 15:
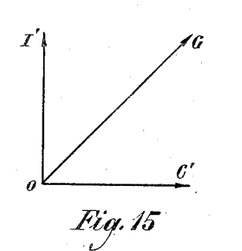

Referring to Fig. 13, let OL represent the current received through the network Y from the line. OL is made up of the two components OA and OB, due to the transmission of signals, the synchronizing channel being used in this case for two message channels operated on the principle of phase discrimination. The electromotive force between points 80 and 81 across the inductance $jn$ and resistance $n$ in the network leads the current by 45 degrees and may be represented by OI, Fig. 14. OC, equal in length to OI, represents the electromotive force between the points 80' and 81 across the condenser and resistance in this network. One-half of each of these electromotive forces is applied to the respective primaries of transformers 77 and 77', and consequently the resultant of these potentials is applied to the grid of tube 85. This is shown in Fig. 15, OG representing the grid potential whose components are the equal magnitude potentials OI' and OC'. The phase of the synchronizing frequency is determined by the phase of OG. The output of tube 85 remains constant in magnitude, of course, inasmuch as the magnitude of OL remains constant regardless of the signals being transmitted.

The purpose of the apparatus under discussion, then, is to keep OG constant in phase as the phase of OL is changed due to signaling. The following example will show that this is true for one specific change in the phase of OL, and it can be similarly shown that this also holds for the other possible cases.

Referring for a moment to Fig. 11, it should be understood that a reversal of OA (Fig. 13) operates relay $PR_1$, which in turn operates relay 83' and so reverses the phase applied to transformer primary 77'. Similarly, a reversal of OB reverses the phase applied to 77. It is the purpose of delay network Y to cause the reversal in 77 or 77' to occur at the same instant that OL changes.

Figure 16:
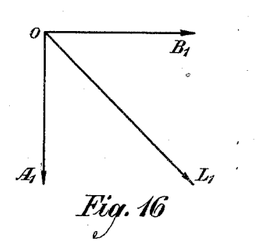
Figure 17:
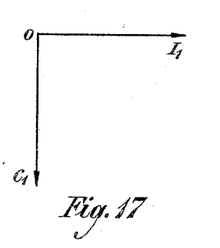
Figure 18:
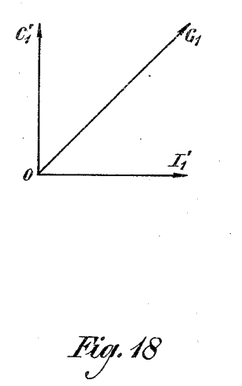

Now as a specific case, suppose that OA is reversed changing OL to $OL_1$, as shown in Fig. 16. OI then becomes $OI_1$, Fig. 17, and OC becomes $OC_1$. Due to the operation of the relays as explained above, $OC_1$ reversed is applied to 77 so that OC' becomes $OC_1'$, Fig. 18. OI' becomes $OI_1'$ in phase with $OI_1$. $OG_1$, the resultant of $OI_1'$, and $OC_1'$, is however the same in phase as OG.

A similar result can be obtained by following through a reversal of OB or reversals in OA and OB together. Consequently, it is evident that the phase and magnitude of the synchronizing frequency are maintained constant.

To transmit four messages on the synchronizing channel, utilizing both phase discrimination and magnitude discrimination, the network $S_1$ of station "West" may be made like the sending network shown in the upper part of Fig. 1. In this case the apparatus represented by the boxes $R_1$ and X of station "East" will be as shown in detail in Fig. 12.

Figure 12:
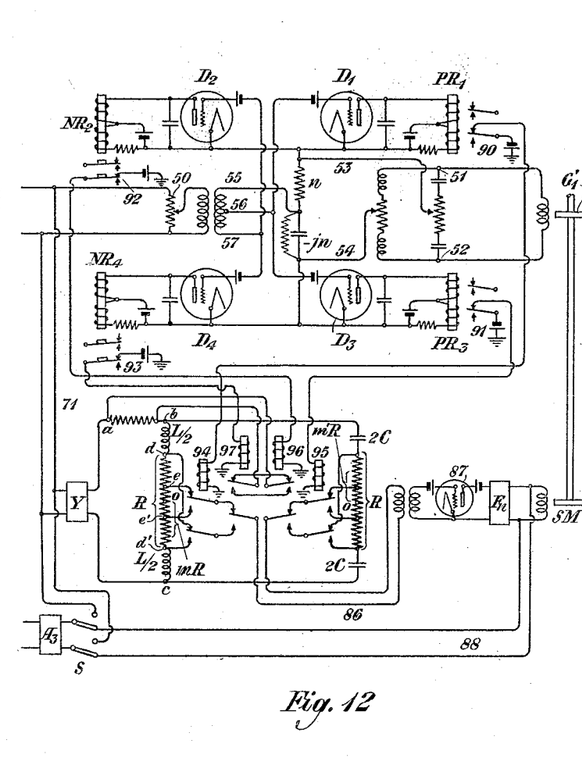
Fig. 12 is a diagram corresponding to Fig. 11 except that here four messages are involved, depending on phase discrimination and also on magnitude discrimination.

The message-receiving network shown in the upper part of Fig. 12 is the same as in the upper part of Fig. 2 except that each of the four receiving relays $PR_1$, $PR_3$, $NR_2$ and $NR_4$ has an extra contact controlling the respective relays 94, 95, 96 and 97, whose function will be explained presently.

The incoming synchronizing current modified both by phase reversals and magnitude changes goes through the relay network Y, whose purpose is the same as for Fig. 11. The electromotive force at the output terminals of the delay network Y may be represented by the expression $$A \cos pt + B \sin pt$$

where A and B may each have one of two magnitudes and may each be subject to reversal of sign.

Assume for the present that the resistance $a$, $b$ is shunted, as indeed is the case, with the contacts in the positions shown in Fig. 12.

It will be seen that there are two parallel branches from $b$ to $c$, one comprising inductance L in series with resistance R, and the other comprising capacity C in series with resistance R. These quantities are related by the equation $$2\pi f L = R = \frac{1}{2\pi f C}$$

Accordingly, it follows that the current through the inductive branch lags and may be represented by the expression $$\frac{A}{2R}\left(\cos pt + \sin pt\right) + \frac{B}{2R}\left(\sin pt - \cos pt\right)$$

Also, the current in the capacity branch leads and is $$\frac{A}{2R}\left(\cos pt - \sin pt\right) + \frac{B}{2R}\left(\sin pt + \cos pt\right)$$

It will be seen that the conductors 86 take off current from adjustable taps along the resistances R in the two branches between $b$ and $c$. Let the middle point of each resistance R be represented by $o$ and let the amount of resistance between $o$ and the tap on the inductance branch be $mR$, and let the amount of resistance between $o$ and the tap in the capacity branch be $m'R$. Let $m$ be positive when the corresponding tap is below $o$ and let $m'$ be positive when the corresponding tap is above $o$. It follows that the voltage taken off by the conductors 86 is given by the expression $$\frac{mA}{2}\left(\cos pt + \sin pt\right) + \frac{mB}{2}\left(\sin pt - \cos pt\right)$$
$$+ \frac{m'A}{2}\left(\cos pt - \sin pt\right) + \frac{m'B}{2}\left(\sin pt + \cos pt\right)$$

which may be written $$\frac{1}{2}\left(mA - mB + m'A + m'B\right)\cos pt$$
$$+ \frac{1}{2}\left(mA + mB - m'A + m'B\right)\sin pt$$

It is a determinate problem to choose $m$ and $m'$ corresponding to respective values of $A$ and $B$ in such a way that the value of this expression shall not be changed, in other words, so that the voltage in the conductors 86 shall be equal to $$S \cos pt + T \sin pt$$

where S and T are constants.

Equating the corresponding co-efficients of the last two expressions and solving, and simplifying by putting $$S = T = 1/2 \text{ we get}$$

$$m = \frac{A}{A^2 + B^2} \text{ and } m' = \frac{B}{A^2 + B^2}$$

These equations give the following table of values for typical values of A and B:

|  | $|A| = 1$ | $|A| = 3$ |
|---|---|---|
| $|B| = 1$ | $|m| = 1/2$ <br> $|m'| = 1/2$ | $|m| = 3/10$ <br> $|m'| = 1/10$ |
| $|B| = 3$ | $|m| = 1/10$ <br> $|m'| = 3/10$ | $|m| = 1/6$ <br> $|m'| = 1/6$ |

As shown in Fig. 12, the potentiometers, each having a total resistance R, are operated by the four relays 94, 95, 96 and 97. It will be seen that relay 94 reverses the algebraic sign of $m$ and the relay 95 reverses the algebraic sign of $m'$. These two relays are controlled respectively by the receiving relays $PR_1$ and $PR_3$ so that they effect reversal of sign of $m$ and $m'$ according as the signs of A and B are reversed respectively.

Another relay 96 changes the magnitude of $m'$ and also controls the resistance $a$, $b$. This relay is governed by the receiving relay $NR_2$ and is operated by changes of magnitude in A. As will be explained a little more definitely a few lines further along, this relay 96 compensates for changes in A so as to keep the magnitude in the output conductors 86 unchanged. Similarly, the relay 97 changes the magnitude of $m$ and also controls the resistance $a$, $b$, and is itself controlled by the receiving relay $NR^4$.

By proportioning the resistance $a$, $b$ so that its presence reduces the current in the potentiometer in the ratio of 3 to 5, the above conditions for $m$ and $m'$ to keep the voltage constant in the conductors 86 are satisfied, provided the taps along the resistance R at the left are arranged so that $$\frac{od}{oe} = \frac{od'}{oe'} = 3$$

in this specific instance and similarly for the other resistance R at the right.

Thus it is established that the voltage impressed on the input transformer for the amplifier 87 remains constant in magnitude and uninterrupted in phase regardless of the variations in voltage of the currents received from the line as caused by the signals on the line. As in the case of Fig. 11, the delay network Y must be so adjusted that any change in the line voltage arrives at $a$ and $c$ at the instant that the proper relays in the potentiometer have operated to care for this change.

The conductors 88 and switch S apply a constant alternating electromotive force to amplifier $A_3$ whose output goes to voltmeter V.

By means of the apparatus of Fig. 12 it becomes possible to synchronize over a channel that carries four messages by means of phase and magnitude discrimination.

The system of Figs. 1 and 2 is adapted for operation in a case in which the phase shift involved in transmission over the line $l_1$ is substantially the same from time to time. This being the case, adjustment made by the taps 53 and 54 will be lasting and will not have to be changed from time to time. In case the properties of the line are such that the phase shift over the line changes from time to time, the system shown in Figs. 3 and 4 may be employed. At station "West" shown in Fig. 3, the constant speed motor M, the generators $G_1$, $G_2$ and $G_3$, the adjustable network N, the sending networks $S_2$ and $S_3$ and the respective filters $F_1$, $F_2$ and $F_3$ are the same as for Fig. 1. Interposed between each generator $G_1$, $G_2$ or $G_3$ and the respective network N, $S_2$ or $S_3$ is an adjustable phase shifter $P_1$, $P_2$ or $P_3$.

Figure 3:
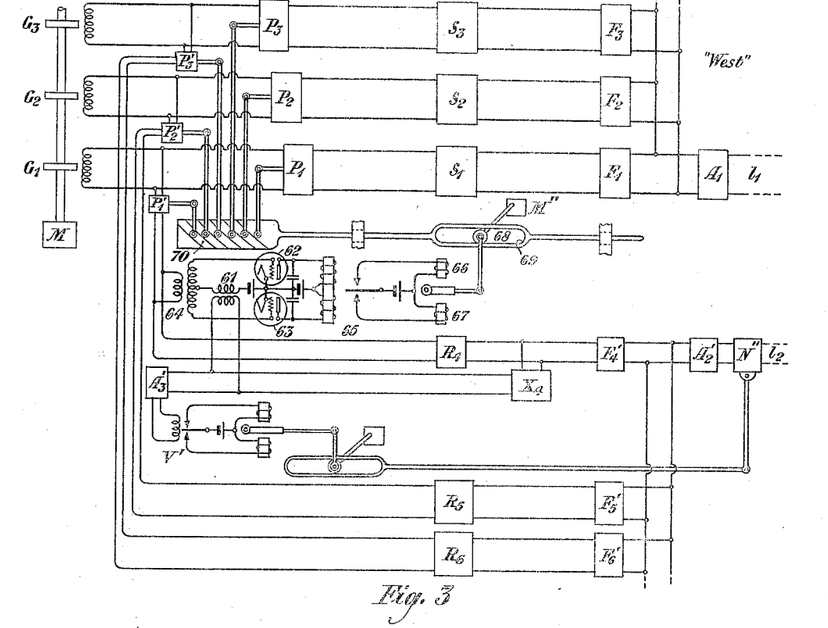
Fig. 3 is a diagram of a sending and receiving equipment with provision for automatic phase adjustment.
Figure 4:
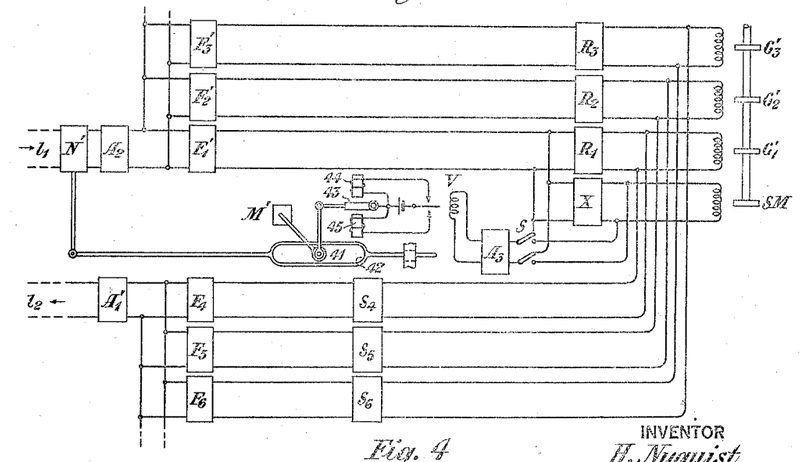
Fig. 4 is a diagram of a station at the opposite end of the lines from the station of Fig. 3.

In the system of Figs. 3 and 4, two lines are employed, $l_1$ for transmitting from west to east and $l_2$ for transmitting from east to west. These may be the wires of a four-wire system. Reception at the station "East" on the line $l_1$ is the same as explained heretofore for Fig. 2, and the upper part of Fig. 4 is the same as Fig. 2.

The branch circuits from the generators $G_1'$, $G_2'$ and $G_3'$ go, respectively, to the sending networks $S_4$, $S_5$ and $S_6$ and the respective filters $F_4$, $F_5$ and $F_6$ to the line $l_2$ from east to west. Thus it will be seen that the apparatus at the lower part of Fig. 4 is very similar to that of Fig. 1, the pilot carrier frequency current being that received from station "West" on the line $l_1$ and sent back over line $l_2$.

At station "West" shown in Fig. 3, the incoming currents on the line $l_2$ are adjusted automatically for magnitude in the adjustable network N'' by the voltmeter relay V' and associated apparatus like that shown in the lower part of Fig. 2. The received pilot frequency current has its signal variations neutralized in network $X_4$ and goes thence to the voltmeter relay V', and a multiple branch carries this same frequency to the primary of the transformer 61 whose secondary is connected to apply the resulting electromotive forces alike to the grids of the two three-electrode vacuum tube detectors 62 and 63.

Figure 7:
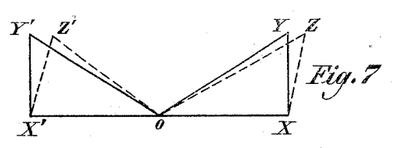

Reception in network $R_4$ is similar to that in networks $R_5$ and $R_6$. The output from the pilot frequency $G_1$ goes to network $R_4$ from a branch circuit through the phase shifter $P_1'$, and the same current also goes to the primary of the transformer 64 and develops an electromotive force which is applied in phases opposite to each other to the grids of the two three-electrode vacuum tube detectors 62 and 63. The normal adjustment of the phase shifters $P_1$ and $P_1'$ will be such that the electromotive forces developed in the secondaries of the transformers 61 and 64 will be 90 degrees apart. Accordingly, under such normal conditions, the full line vector diagram of Fig. 7 will apply. On one grid, the electromotive force will be OY, the sum of OX and XY. On the other grid, it will be OY', the sum of OX' and X'Y'.

But suppose there is a slight departure from the 90 degree relation between the two electromotive forces in the secondaries of the transformers 61 and 64. The vector diagram shown in dotted lines in Fig. 6 will then obtain and the electromotive forces on the grids of the two tubes 62 and 63 will become, respectively, OZ and OZ'.

When the electromotive forces on these girds were equal, namely OY and OY', the output currents of the detectors 62 and 63 were equal and hence the armature of the relay 65 stood at neutral. But with the unequal electromotive forces OZ and OZ' on the grids of the two tubes, the output currents are unequal and the armature of the relay 65 will close on one contact or the other, energizing one or the other of the magnets 66 and 67. The result will be to push the wheel 68 against one side or the other of the yoke 69. This wheel 68 is turned constantly by the motor M'' so that the cams 70 are shifted to the right or the left. These cams engage respective rollers which are mechanically connected so that their displacements adjust the phase shifters $P_1$, $P_2$, $P_3$, $P_1'$, $P_2'$ and $P_3'$. The adjustment of the phase shifter $P_1$ and $P_1'$ restores the 90 degree relation between the electromotive forces in the secondaries of the transformers 61 and 64. The adjustments are opposite and equal for $P_1$ and $P_1'$, likewise for $P_2$ and $P_2'$, and likewise for $P_3$ and $P_3'$, and in each of the three round trip channels of different carrier current frequency, the currents are made to arrive at the receiving apparatus in proper phase relation with the locally generated currents.

I claim:

1. The method of signaling which consists in sending a current comprising a component of a certain frequency modified at the sending end according to a signal to be transmitted, and detecting such signal at the receiving end and also compensating the received component in a branch circuit according to the detected signals to remove the signal modifications therefrom, and applying the compensated current to synchronize the receiving apparatus with the transmitting apparatus at the other end of the line.

2. In the art of signaling by electric currents, the method which consists in signaling on a synchronizing current and at the receiving end detecting the signals and also deriving a current of pure frequency to be applied for synchronizing purposes.

3. In the art of transmitting messages by means of electric currents, the method which consists in signaling on a synchronizing component of current and at the receiving end detecting the signals and compensating the received component in a branch circuit accordingly to make it of pure frequency and applying it for synchronizing purposes.

4. In a system for signaling by means of electric currents, receiving apparatus comprising two multiple branch circuits to receive a current component of a certain frequency, apparatus associated with one such branch circuit to detect a message carried by such component, and apparatus in the other branch circuit to derive a current of pure frequency unaffected by the message and to apply such current for synchronizing the receiving apparatus.

5. In a signaling system, receiving apparatus comprising a filter adapted to pass a current component of a certain frequency and two multiple branch circuits connected with the output of said filter, apparatus in one such branch to detect a message on the said component of current, apparatus in the other said branch to derive a current of pure frequency unmodified by the message, and means to apply the last mentioned current for synchronizing purposes.

6. In a signaling system, receiving apparatus comprising a filter adapted to pass a current component of a certain frequency and two multiple branch circuits connected with the output of said filter, apparatus in one such branch to detect a message on the said component of current, apparatus in the other said branch to compensate for the signal modifications, control relays therefor governed by the apparatus in the receiving branch, and synchronizing apparatus to be operated by the compensated current.

7. In a multiplex carrier current system, means for generating carrier currents of various frequencies and superposing them upon a transmission line, means to modulate all of these carrier currents in accordance with messages to be transmitted, and synchronizing means to be controlled by one of these carrier currents.

8. In a system for signaling by means of electric currents, receiving apparatus comprising two multiple branch circuits to receive a current component of a certain frequency, apparatus associated with one such branch circuit to detect a message carried by such component, apparatus in the other branch circuit to derive a current of pure frequency unaffected by the message and to apply such current for synchronizing the receiving apparatus, and a delay network in the last mentioned branch circuit.

9. In a signaling system, receiving apparatus comprising a filter adapted to pass a current component of a certain frequency and two multiple branch circuits connected with the output of said filter, apparatus in one such branch to detect a message on the said component of current, apparatus in the other said branch to compensate for the signal modifications, control relays therefor governed by the apparatus in the receiving branch, synchronizing apparatus to be operated by the compensated current, and a delay network in the said other branch to equalize the operation of said relays.

10. The method of signaling, which consists in sending a current comprising a component of a certain frequency modified at the sending end according to a signal to be transmitted, and at the receiving end detecting the signal and also deriving from said component an unmodified current of definite frequency, and applying it for phase regulation of the system involved.

11. In the art of signaling by electric currents, the method which consists in signaling on a synchronizing current, and at the receiving end detecting the signals and also deriving a current of pure frequency to be applied for compensation of variations of the propagation constant involved in transmission.

In testimony whereof, I have signed my name to this specification this 10th day of March 1925.

HARRY NYQUIST.